United States Patent [19]

Hamm

[11] 4,063,917

[45] Dec. 20, 1977

[54] GLASS AND MIRROR MAKING PROCESS

[76] Inventor: Earl L. Hamm, 2234 Smyrna Road Northwest, Conyers, Ga. 30207

[21] Appl. No.: 757,092

[22] Filed: Jan. 5, 1977

[51] Int. Cl.$^2$ .............................................. C03C 1/00
[52] U.S. Cl. .................................... 65/30 R; 65/134; 65/374 M; 106/52
[58] Field of Search .......................... 423/332; 106/52; 65/30 R, 134, 374 R, 374 M

[56] References Cited

U.S. PATENT DOCUMENTS

| 3,847,583 | 11/1974 | Dislich et al. | 65/134 X |
| 3,877,954 | 4/1975 | Wüstefeld | 65/30 R X |

OTHER PUBLICATIONS

Identification of Organic Compounds – Shriner et al., Third Edition, 1948, Chapman & Hall, Ltd., p. 145.

*Primary Examiner*—Robert L. Lindsay, Jr.

[57] ABSTRACT

This invention involves making a glass article or mirrored glass article by combining equal amounts of ammonium hydroxide, acetaldehyde, potassium nitrate, water glass and optionally silver nitrate, heating the mixture to 195.8° C in a mold to expell hydrogen and acetaldehyde and optionally collecting the hydrogen and acetaldehyde in a reservoir.

2 Claims, No Drawings

GLASS AND MIRROR MAKING PROCESS

This invention relates generally to a more convenient and inexpensive method of making glass or mirrors. The most unique method of production which makes the mirrors more easily produced than any other mirrors is because instead of a solid piece of glass having to be cut to a specific size and backed on one side with silver. My mirrors can be produced along with the production of the glass into a solid state. They can be made if desired in a convex, flat, concave and even spherical and paraboloid shapes.

The following chemicals are used to make the mirrors, (silver nitrate AGNO3), ammonium hydroxide, (acetaldehyde CH3HCO), potassium nitrate KNO3) and water glass. A water solution which should contain 20 to 50 percent of dissolved sodium — silicate and having a ratio of sodium oxide $Na_2O$, to silica — $SiO_2$, ranging from 1:1.6 to 1:4. Water glass is made in two forms,: as a white powder or lumps, formed by shattering the hot melt from the furnance with a stream of cold water and then grinding and screening the fragments; or the form of water glass used in this invention which is made by dissolving the solid with superheated steam. The viscosity of the water glass should range from 22 to 69 percent Baume. The silver nitrate $AgNO_3$, ammonium hydroxide, $NH_4OH$ acetaldehyde CH3HCO, and — potassium nitrate, $KNO_3$, should all be the same weight as the water glass, assuming that this has been done the five chemicals are to be mixed and poured into the desired mold in which the layman wants. The solution should be heated to 195.8° centigrade for at least five minutes. When the heat source has been removed, the water glass solidifies into a superb mirror. If the production of a mirror is not desired then the silver nitrate AGNO3 may be omitted, solution is heated to 195.8° centigrade and the heat source is removed after 10 minutes to come up with solid glass which takes less time and energy to make than any other method of making solid glass. This process is carried out by a heating means, a mold into which this solution is poured and a pipe which maybe used to catch the hydrogen and acetaldehyde which is driven off in a vapor form during the chemicals reactions. A storage tank is used to store the hydrogen and acetaldehyde if they are desired to be used again.

I claim the following:

1. A method for making a glass article by heating ammonium hydroxide, acetaldehyde, potassium nitrate and water glass in solution form, each material being added in equal weights and put into a mold, said mold being made from a material that is not glass or of a metal that does not alloy with silver, heating the contents of the mold to a temperature ranging from 195.8° centigrade to 300° centigrade for a time sufficient to expell the hydrogen and the acetaldehyde in a reservoir.

2. The method of claim 1 in which the article is glass in which an equal weight of silver nitrate, based on the weight of each of the other materials is added with the materials in claim 1, and heated at the same temperatures and a mirror will be produced.

* * * * *